US011558886B2

(12) United States Patent
Zhang et al.

(10) Patent No.: US 11,558,886 B2
(45) Date of Patent: Jan. 17, 2023

(54) NON-CONTENTION BASED LOW LATENCY SCHEDULING REQUEST TRANSMISSION

(71) Applicant: APPLE INC., Cupertino, CA (US)

(72) Inventors: Yushu Zhang, Beijing (CN); Yuan Zhu, Beijing (CN); Wenting Chang, Beijing (CN); Gang Xiong, Beaverton, OR (US); Qinghua Li, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 15/565,436

(22) PCT Filed: Dec. 10, 2015

(86) PCT No.: PCT/US2015/064964
§ 371 (c)(1),
(2) Date: Oct. 10, 2017

(87) PCT Pub. No.: WO2016/186698
PCT Pub. Date: Nov. 24, 2016

(65) Prior Publication Data
US 2018/0132268 A1    May 10, 2018

(30) Foreign Application Priority Data
May 21, 2015    (WO) ................ PCT/CN2015/079492

(51) Int. Cl.
*H04W 72/12*    (2009.01)
*H04W 28/04*    (2009.01)
*H04W 28/02*    (2009.01)
*H04L 1/18*    (2006.01)
*H04W 28/10*    (2009.01)
(Continued)

(52) U.S. Cl.
CPC ........... *H04W 72/1284* (2013.01); *H04L 1/18* (2013.01); *H04W 28/02* (2013.01);
(Continued)

(58) Field of Classification Search
CPC ............. H04W 72/1284; H04W 72/14; H04W 72/0413; H04W 28/10; H04W 76/28;
(Continued)

(56) References Cited

U.S. PATENT DOCUMENTS

2012/0275391 A1   11/2012   Cui et al.
2012/0300744 A1   11/2012   Larmo et al.
(Continued)

FOREIGN PATENT DOCUMENTS

KR    1020070121576 A    12/2007
WO       2007/148927 A1    12/2007

OTHER PUBLICATIONS

Notificatoin of Publication of Patent Application No. CN201580079137. 3, Jan. 10, 2018, 4 pages.
(Continued)

*Primary Examiner* — Mohammed S Chowdhury
(74) *Attorney, Agent, or Firm* — Fay Kaplun & Marcin, LLP

(57) ABSTRACT

Briefly, in accordance with one or more embodiments, an apparatus of a user equipment (UE) comprises circuitry to configure a scheduling request (SR) transmission based on a physical uplink control channel (PUCCH), and combine the scheduling request with a buffer status report (BSR). The UE transmits the combined SR and BSR in a single subframe to a network entity, receives uplink resource scheduling from the network entity in reply to the combined SR and BSR, and transmits uplink data to the network entity according to the uplink resource scheduling.

20 Claims, 6 Drawing Sheets

(51) Int. Cl.
  *H04W 72/04* (2009.01)
  *H04W 72/14* (2009.01)
  *H04L 1/16* (2006.01)
  *H04W 76/28* (2018.01)
(52) U.S. Cl.
  CPC ....... *H04W 28/0278* (2013.01); *H04W 28/04* (2013.01); *H04W 28/10* (2013.01); *H04W 72/0413* (2013.01); *H04W 72/14* (2013.01); H04L 1/1671 (2013.01); *H04W 76/28* (2018.02)
(58) Field of Classification Search
  CPC . H04W 28/0278; H04W 28/04; H04W 28/02; H04L 1/18; H04L 1/1671
  USPC ........................................................ 370/336
  See application file for complete search history.

(56) References Cited

U.S. PATENT DOCUMENTS

| | | | | |
|---|---|---|---|---|
| 2014/0133447 | A1* | 5/2014 | Moulsley | H04W 72/1278 370/329 |
| 2014/0177560 | A1 | 6/2014 | Guo | |
| 2014/0204800 | A1* | 7/2014 | Moulsley | H04L 5/0023 370/254 |
| 2015/0071213 | A1* | 3/2015 | Pajukoski | H04W 72/1284 370/329 |
| 2017/0086219 | A1* | 3/2017 | Lee | H04W 72/12 |
| 2017/0202009 | A1* | 7/2017 | Kim | H04W 72/1284 |
| 2017/0208610 | A1* | 7/2017 | Tang | H04W 72/1242 |
| 2018/0227938 | A1* | 8/2018 | Lee | H04L 5/00 |

OTHER PUBLICATIONS

PCT Search Report and Written Opinion, PCT/US2015/064964, 15 pages, dated Apr. 8, 2016.
Notification Concerning Transmittal of International Preliminary Report on Patentability with Written Opinion (PCT/US2015/064964), dated Nov. 30, 2017, 11 pages.
Office Action received for European Patent Application No. 15892792.1 dated Jul. 17, 2019, 4 pages.

\* cited by examiner

NON-CONTENTION BASED LOW LATENCY SCHEDULING REQUEST TRANSMISSION

CROSS REFERENCE TO RELATED APPLICATIONS

This application claims priority under 35 U.S.C. § 371 to International Application No. PCT/US2015/064964 filed Dec. 10, 2015, entitled NON-CONTENTION BASED LOW LATENCY SCHEDULING REQUEST TRANSMISSION which in turn claims priority under 35 U.S.C. 365(b) to International Application No. PCT/CN2015/079492 filed May 21, 2015. Said Application No. PCT/US2015/064964 and said Application No. PCT/CN2015/079492 are incorporated herein by reference in their entireties.

BACKGROUND

In one or more embodiments, a network may operate in accordance with a Third Generation Partnership Project (3GPP) Long Term Evolution (LTE) standard or a Long Term Evolution Advanced (LTE-A). In such a network, a scheduling request (SR) may be used for user equipment (UE) to request an uplink resource. The UE may send its SR in a non-contention based manner based on a physical uplink control channel (PUCCH). First, the UE sends its scheduling request (SR) to an evolved Node B (eNB) in the PUCCH. The UE waits for the eNB to send an uplink (UL) grant before the UE sends its buffer status report (BSR) to the eNB. In response, the eNB may schedule the uplink resource for uplink data transmission for the UE based on the received BSR wherein eNB sends the schedule at a next UL grant. The UE may then transmit its UL data to eNB according to the scheduled resources. Such an arrangement may have high latency since the SR and the BSR are transmitted in different subframes, especially if the UE has a short buffer.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
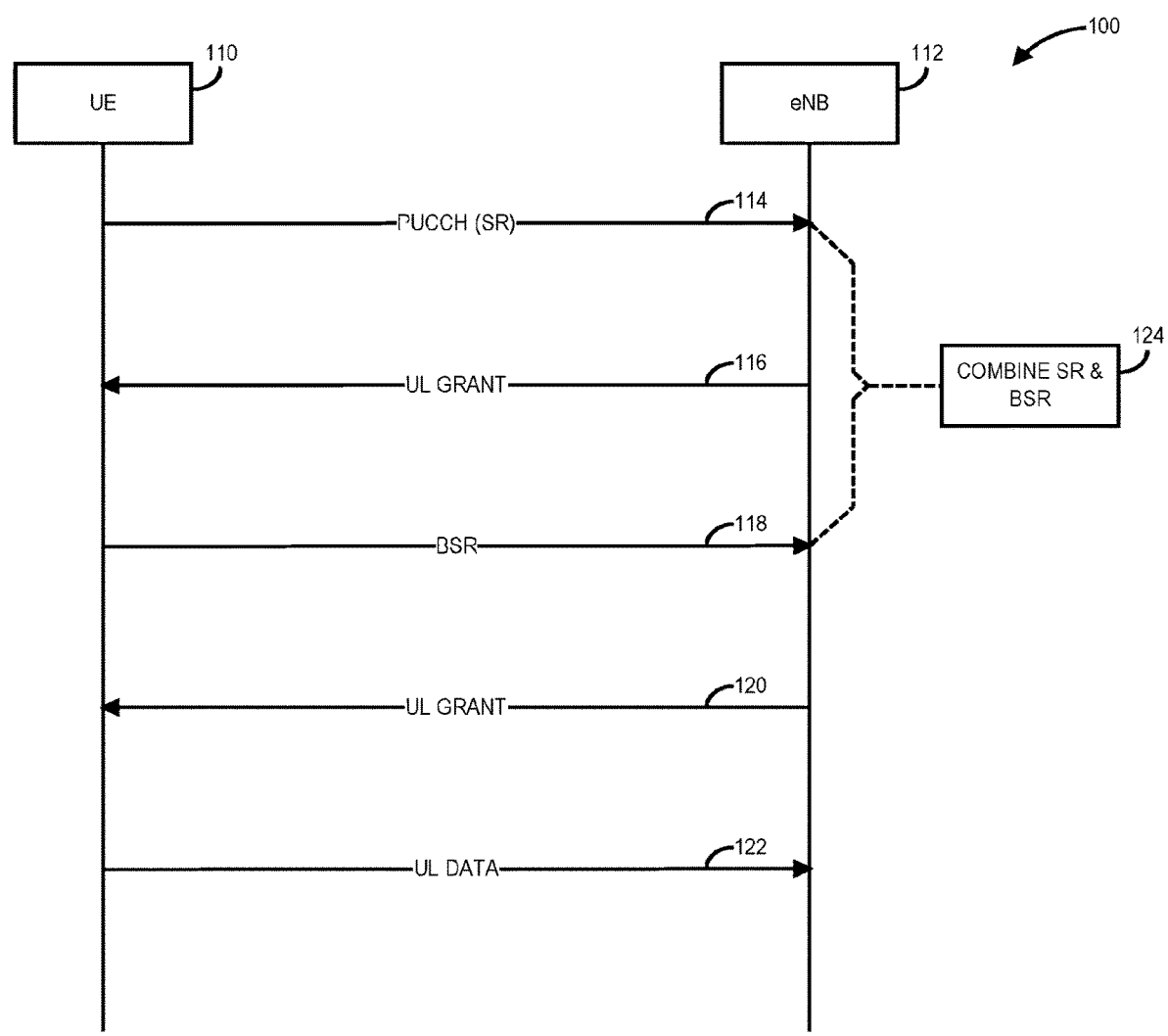
FIG. 1 is a diagram of a network illustrating reduction of latency in the scheduling request transmission in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a network illustrating reduction of latency in the scheduling request transmission in accordance with one or more embodiments will be discussed. As shown in FIG. 1, in one or more embodiments network 100 may operate in accordance with a Third Generation Partnership Project (3GPP) Long Term Evolution (LTE) standard or a Long Term Evolution Advanced (LTE-A), although the scope of the claimed subject matter is not limited in this respect. UE 110 may send the SR and the BSR together within the same subframe, instead of in different subframes at operation 114 and operation 116 after UL grant operation 116, by combining the SR and the BSR at procedure 124 so that the combined SR and BSR may be transmitted in a single operation in the same subframe. In one or more embodiments, the combined SR and BSR may be transmitted together based on an LTE non-contention based SR transmission framework, so that the latency of BSR transmission and the corresponding uplink grant procedure may be reduced. In such an arrangement, after receipt of a combined SR and BSR operation, combined at procedure 124, eNB 112 may schedule UL resources at UL grant procedure 120 to allow for UE 110 to transmit UL data at procedure 120. For example, the combined SR and BSR message may be transmitted based on PUCCH format 1 or PUCCH format 2, although the scope of the claimed subject matter is not limited in these respects.

In one or more embodiments, combining the SR and the BSR into a single message may reduce uplink data transmission latency for the UE 110, especially if UE 110 has a short data buffer, by eliminating procedure 116 and procedure 118. The transmission of a combined SR and BSR message may be based on the PUCCH in a non-contention manner wherein UE 110 may be configured with an SR transmission subframe period and an offset defining the subframe number for UE 110 to transmit its SR. The eNodeB 110 may detect this combined SR and BSR transmission at the same subframe to check whether an uplink resource is needed for the UE 110. In one embodiment, the BSR may comprise an 8-bit message which as defined in 3GPP Technical Standard (TS) 36.321, and the SR may be a 1-bit trigger, although the scope of the claimed subject matter is not limited in these respects. A first approach to transmit the SR and the BSR within the same subframe is shown in and described with respect to FIG. 2, below.

Figure 2:
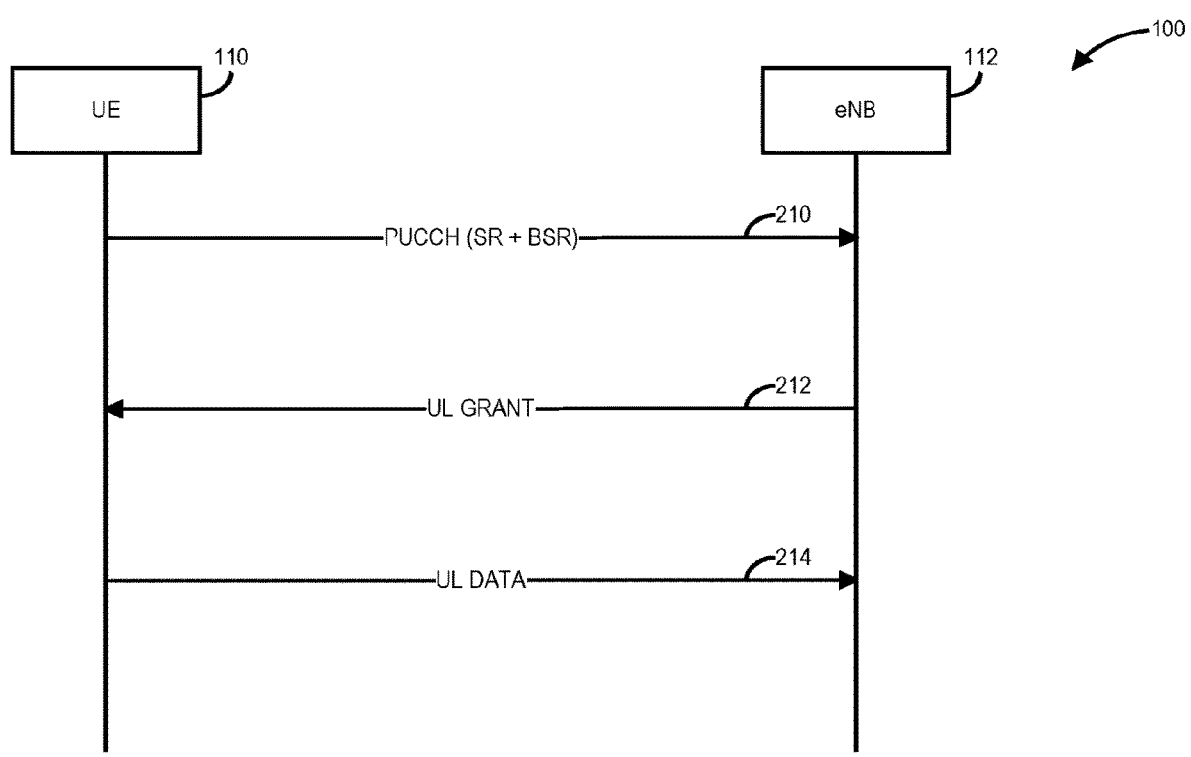
FIG. 2 is a diagram of the network of FIG. 1 in which a scheduling request and a buffer status report are sent together within a subframe in accordance with one or more embodiments.

Referring now to FIG. 2, a diagram of the network of FIG. 1 in which a scheduling request and a buffer status report are sent together within a subframe in accordance with one or more embodiments will be discussed. In one embodiment, a scheduling request (SR) for UE 110 may be configured to transmit in PUCCH format 2 way at the same PUCCH resource as the periodical Channel State Information (CSI) feedback. The buffer status report (BSR) bits may be transmitted based on PUCCH format 2. The configured SR subframe may be different from the periodical CSI feedback subframe. The UE 110 may feedback its periodical CSI when SR transmission and periodical CSI feedback are transmitted in the same subframe.

In some embodiments, the signal generation may be the same as described in section 5.4.2 of 3GPP TS 36.211, where the input bits $b(0), b(1), \ldots, b(N-1)$ may be the BSR message, and N is the message bits number, which may be 8, as an example. In such embodiments, a procedure to transmit a combined SR and BSR could be as shown in FIG. 2. The combined SR and BSR message may be transmitted from UE 110 to eNB 112 at procedure 210. If eNB 112 decodes the combined SR and BSR message correctly, eNB 112 may allocate a reasonable resource in uplink grant at procedure 212 for the next uplink data transmission from UE 110 at procedure 214. An alternative approach to transmit the SR and the BSR within the same subframe is shown in and described with respect to FIG. 3, below.

Figure 3:
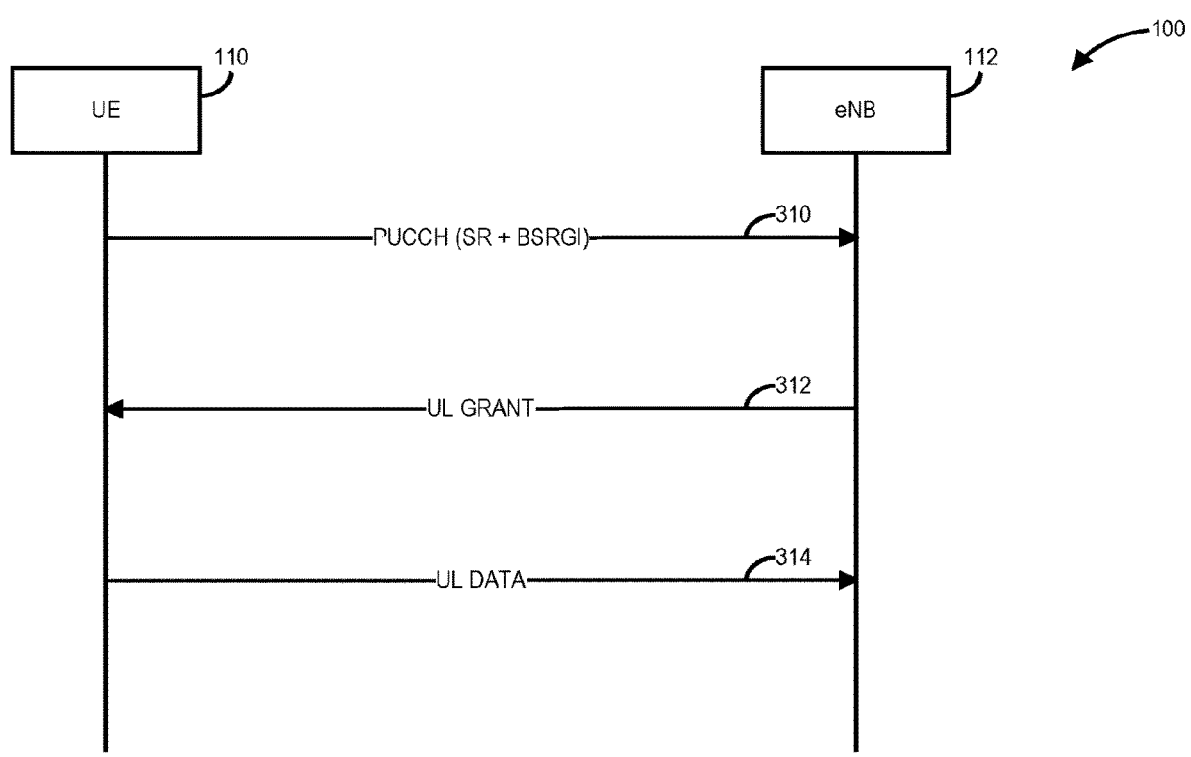
FIG. 3 is a diagram of the network in FIG. 1 in which a scheduling request and buffer status report group indicator are sent together within a subframe in accordance with one or more embodiments.

Referring now to FIG. 3, a diagram of the network in FIG. 1 in which a scheduling request and buffer status report group indicator are sent together within a subframe in accordance with one or more embodiments will be discussed. In another embodiment, if UE 110 has a long buffer or multiple Logical Channel Groups (LCGs), the BSR may be sent together with SR, but the uplink packages transmission may not complete within a single subframe. For such users, and exact BSR value associated with the SR does not have to be transmitted. If UE 110 has a short buffer wherein the uplink packages transmission is able to be completed within a single subframe, enough Resource Blocks (RBs) may be scheduled so that the data may be transmitted in a single roundtrip, and the transmission latency could be reduced. As a result. Therefore, instead of transmitting an exact BSR, a BSR Group Indicator (BSRGI) may be sufficient to indicate whether a long BSR or a short BSR is at the UE 110.

In such an arrangement, the BSR may be divided into M number of groups, wherein M may be, for example, 2, 3 or 4, and so on. The BSRGI may be used to indicate which BSR groups to which the current BSR belongs, and the value of the BSRGI may be decided by a BSR group threshold. The BSR group threshold may depends on a power control factor of the UE 110, uplink CSI, and so on. The BSR group threshold may be configured by eNB 112 via high layer messages, and the BSR group threshold may be cell-specific or UE-specific. For example, the BSR may be divided into two groups, and the group threshold may be set to be T. If the value of BSRGI is zero (0), the value of the BSRGI indicates current buffer length of UE 110 is below K, where K is the maximum buffer size for BSR whose value is equals to T. Otherwise, the buffer length of the UE 110 is above K.

In one or more embodiments, the BSRGI may be transmitted based on PUCCH format 1 or PUCCH format 2. For PUCCH format 1, the PUCCH signal generation may be based on 5.4.1 in 3GPP TS 36.211, and its Demodulation Reference Signal (DMRS) generation may be based on section 5.5.2.2 of 3GPP TS 36.211. In some embodiments, format 1b may be utilized for SR transmission associated with acknowledgement or negative acknowledgment (ACK/NACK) transmission. One of the input bits $b(0)$ or $b(1)$ may indicate the ACK/NACK state, and the other one of the input bits may indicate the BSRGI. If UE 110 has two codeword ACK/NACK feedback, an ACK/NACK bundling may be utilized to compress the two ACK/NACK bits into a single bit if there is collision with SR transmission. Table 1, below, shows an example of the symbol generation method.

TABLE 1

| Example of d(0) Generation | | |
| --- | --- | --- |
| ACK/NACK | BSRGI | d(0) |
| 0 | 0 | 1 |
| 0 | 1 | −j |
| 1 | 0 | j |
| 1 | 1 | −1 |

In an alternative embodiment, a PUCCH format 1c may be utilized which to support four bits of transmission. Two of the input bits may indicate the ACK/NACK state, and the other two bits may indicate the BSRGI. In such an embodiment, an example of symbol generation method may be 16 Quadrature Amplitude Modulation (QAM) may be utilized for symbol generation, although the scope of the claimed subject matter is not limited in this respect.

In embodiments where PUCCH format 2 is utilized, the PUCCH signal generation may be the same as described in section 5.4.1 of 3GPP TS 36.211, while the BSRGI may be transmitted together with feedback CSI. For example BSRGI bits may be added at the tail of CSI bits. In such an example, two tailed bits may be utilized, with an allocation as shown in Table 2, below.

TABLE 2

| Examples of PUCCH format 2 Tailed Bits allocation | |
| --- | --- |
| Tailed Bits | Information |
| 00 | No SR is transmitted |
| 01 | BSRGI = 0 |
| 10 | BSRGI = 1 |
| 11 | BSRGI = 2 |

An example for this procedure is shown in FIG. 3 wherein the combined SR and BSRGI is transmitted in procedure 310, the uplink resources may be scheduled in procedure 312, and the uplink data may be transmitted in procedure 314. In procedure 314, the UE 110 does not transmit the BSR if padding is needed. Then after decoding message of procedure 314, eNB 112 may recognize the UE 110 as having no additional data in its uplink transmission buffer if a BSR is not received. Otherwise, eNB 112 may consider the UE 110 as having uplink data pending transmission, and at the next schedule time, the UE 110 may transmit its exact BSR.

Figure 4:
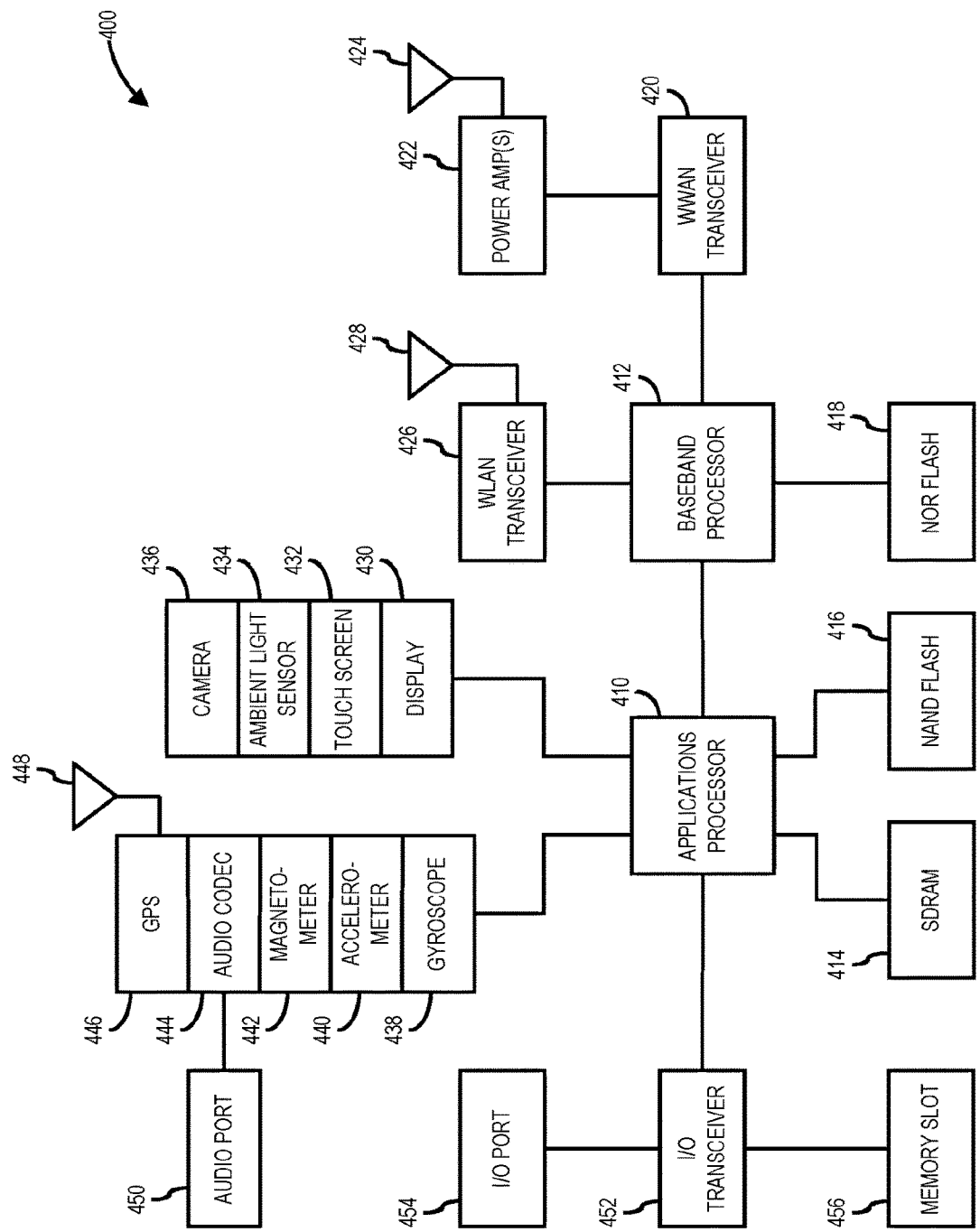
FIG. 4 is a block diagram of an information handling system capable of latency reduction in the scheduling request transmission in accordance with one or more embodiments.

Referring now to FIG. 4, a block diagram of an information handling system capable of latency reduction in the scheduling request transmission in accordance with one or more embodiments will be discussed. Information handling system 400 of FIG. 4 may tangibly embody any one or more of the network elements described herein, above, including for example the elements of network 100 with greater or fewer components depending on the hardware specifications of the particular device. In one embodiment, information handling system 400 may tangibly embody an apparatus of a user equipment (UE) comprising circuitry to configure a scheduling request (SR) transmission based on a physical uplink control channel (PUCCH), combine the scheduling request with a buffer status report (BSR), transmit the combined SR and BSR in a single subframe to a network entity, receive uplink resource scheduling from the network entity in reply to the combined SR and BSR, and transmit uplink data to the network entity according to the uplink resource scheduling. In another embodiment, information handling system 400 may tangibly embody an apparatus of a user equipment (UE) comprising circuitry to configure a scheduling request (SR) transmission based on a physical uplink control channel (PUCCH), combine the scheduling request with a buffer status report group indicator (BSRGI), transmit the combined SR and BSRGI in a single subframe to a network entity, receive uplink resource scheduling from the network entity in reply to the combined SR and BSRGI, and transmit uplink data to the network entity according to the uplink resource scheduling. Although information handling system 400 represents one example of several types of computing platforms, information handling system 400 may include more or fewer elements and/or different arrangements of elements than shown in FIG. 8, and the scope of the claimed subject matter is not limited in these respects.

In one or more embodiments, information handling system 400 may include an application processor 410 and a baseband processor 412. Application processor 410 may be utilized as a general-purpose processor to run applications and the various subsystems for information handling system 400. Application processor 410 may include a single core or alternatively may include multiple processing cores. One or more of the cores may comprise a digital signal processor or digital signal processing (DSP) core. Furthermore, application processor 410 may include a graphics processor or coprocessor disposed on the same chip, or alternatively a graphics processor coupled to application processor 410 may comprise a separate, discrete graphics chip. Application processor 410 may include on board memory such as cache memory, and further may be coupled to external memory devices such as synchronous dynamic random access memory (SDRAM) 414 for storing and/or executing applications during operation, and NAND flash 416 for storing applications and/or data even when information handling system 400 is powered off. In one or more embodiments, instructions to operate or configure the information handling system 400 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 412 may control the broadband radio functions for information handling system 800. Baseband processor 412 may store code for controlling such broadband radio functions in a NOR flash 418. Baseband processor 412 controls a wireless wide area network (WWAN) transceiver 420 which is used for modulating and/or demodulating broadband network signals, for example for communicating via a 3GPP LTE or LTE-Advanced network or the like.

In general, WWAN transceiver 420 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mm-Wave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 420 couples to one or more power amps 442 respectively coupled to one or more antennas 424 for sending and receiving radio-frequency signals via the WWAN broadband network. The baseband processor 412 also may control a wireless local area network (WLAN) transceiver 426 coupled to one or more suitable antennas 428 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 410 and baseband processor 412, and the scope of the claimed subject matter is not limited in these respects. For example, any one or more of SDRAM 414, NAND flash 416 and/or NOR flash 418 may comprise other types of memory technology such as magnetic memory, chalcogenide memory, phase change memory, or ovonic memory, and the scope of the claimed subject matter is not limited in this respect.

In one or more embodiments, application processor 410 may drive a display 430 for displaying various information or data, and may further receive touch input from a user via a touch screen 432 for example via a finger or a stylus. An ambient light sensor 434 may be utilized to detect an amount of ambient light in which information handling system 400 is operating, for example to control a brightness or contrast value for display 430 as a function of the intensity of ambient light detected by ambient light sensor 434. One or more cameras 436 may be utilized to capture images that are processed by application processor 410 and/or at least temporarily stored in NAND flash 416. Furthermore, application processor may couple to a gyroscope 438, accelerometer 440, magnetometer 442, audio coder/decoder (CO-DEC) 444, and/or global positioning system (GPS) controller 446 coupled to an appropriate GPS antenna 448, for detection of various environmental properties including location, movement, and/or orientation of information handling system 400. Alternatively, controller 446 may comprise a Global Navigation Satellite System (GNSS) controller. Audio CODEC 444 may be coupled to one or more audio ports 450 to provide microphone input and speaker outputs either via internal devices and/or via external devices coupled to information handling system via the audio ports 450, for example via a headphone and microphone jack. In addition, application processor 410 may couple to one or more input/output (I/O) transceivers 452 to couple to one or more I/O ports 454 such as a universal serial bus (USB) port, a high-definition multimedia interface (HDMI) port, a serial port, and so on. Furthermore, one or more of the I/O transceivers 452 may couple to one or more memory slots 456 for optional removable memory such as secure digital (SD) card or a subscriber identity module (SIM) card, although the scope of the claimed subject matter is not limited in these respects.

Figure 5:
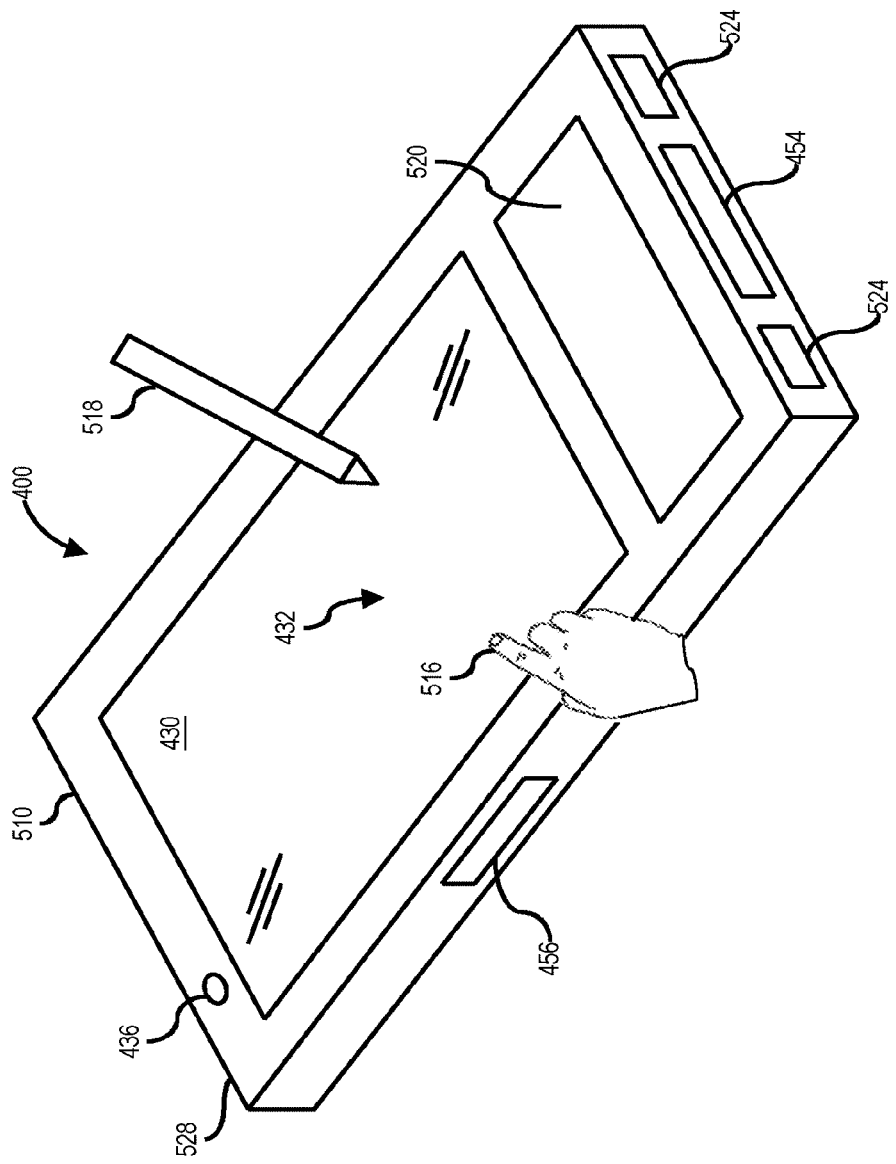
FIG. 5 is an isometric view of an information handling system of FIG. 4 that optionally may include a touch screen in accordance with one or more embodiments.

Referring now to FIG. 5, an isometric view of an information handling system of FIG. 8 that optionally may include a touch screen in accordance with one or more embodiments will be discussed. FIG. 5 shows an example implementation of information handling system 400 of FIG. 4 tangibly embodied as a cellular telephone, smartphone, or tablet type device or the like. The information handling system 400 may comprise a housing 510 having a display 430 which may include a touch screen 432 for receiving tactile input control and commands via a finger 516 of a user and/or a via stylus 518 to control one or more application processors 410. The housing 510 may house one or more components of information handling system 400, for example one or more application processors 410, one or more of SDRAM 414, NAND flash 416, NOR flash 418, baseband processor 412, and/or WWAN transceiver 420. The information handling system 400 further may optionally include a physical actuator area 520 which may comprise a keyboard or buttons for controlling information handling system via one or more buttons or switches. The information handling system 400 may also include a memory port or slot 456 for receiving non-volatile memory such as flash memory, for example in the form of a secure digital (SD) card or a subscriber identity module (SIM) card. Optionally, the information handling system 400 may further include one or more speakers and/or microphones 524 and a connection port 454 for connecting the information handling system 400 to another electronic device, dock, display, battery charger, and so on. In addition, information handling system 400 may include a headphone or speaker jack 528 and one or more cameras 436 on one or more sides of the housing 510. It should be noted that the information handling system 400 of FIG. 5 may include more or fewer elements than shown, in various arrangements, and the scope of the claimed subject matter is not limited in this respect.

As used herein, the terms "circuit" or "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 6:
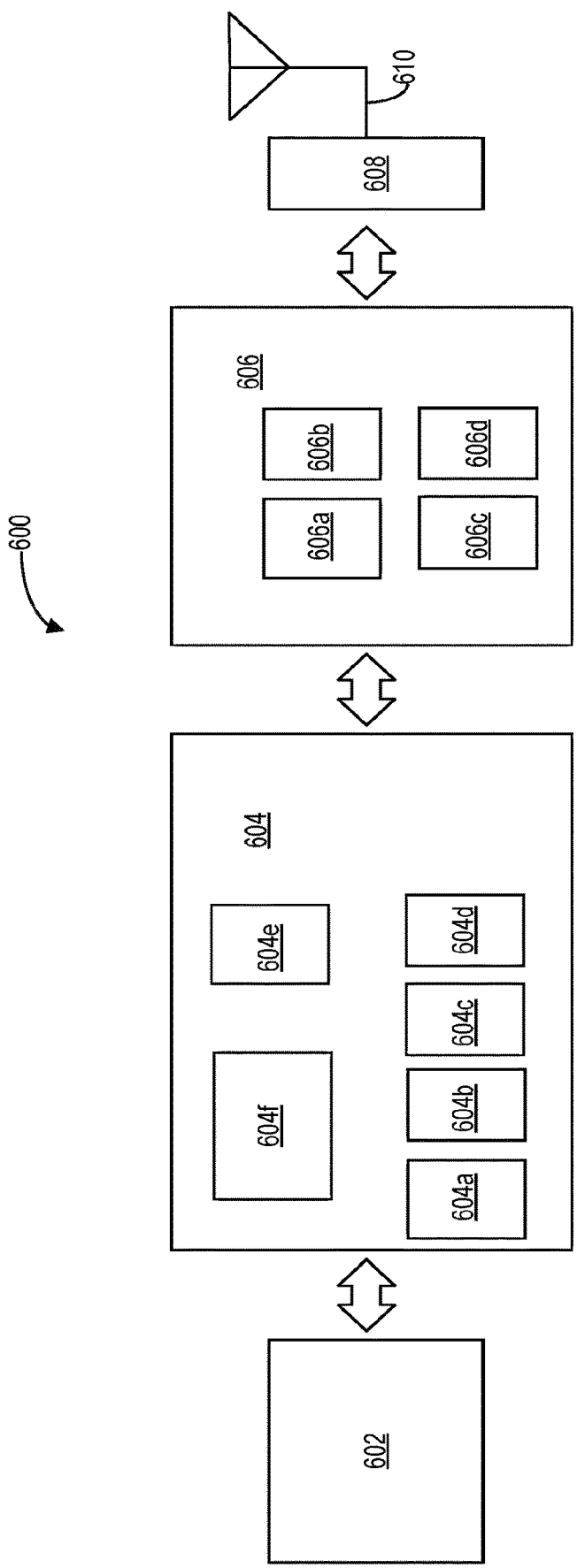
FIG. 6 is a diagram of example components of a wireless device in accordance with one or more embodiments.

Referring now to FIG. 6, example components of a wireless device such as User Equipment (UE) device 110 in accordance with one or more embodiments will be discussed. User equipment (UE) may correspond, for example, to UE 110 of network 100, or alternatively to eNB 112 of network 100, although the scope of the claimed subject matter is not limited in this respect. In some embodiments, UE device 600 may include application circuitry 602, baseband circuitry 604, Radio Frequency (RF) circuitry 606, front-end module (FEM) circuitry 608 and one or more antennas 610, coupled together at least as shown.

Application circuitry 602 may include one or more application processors. For example, application circuitry 602 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 604 may include circuitry such as, but not limited to, one or more single-core or multi-core processors. Baseband circuitry 604 may include one or more baseband processors and/or control logic to process baseband signals received from a receive signal path of RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or one or more other baseband processors 604d for other existing generations, generations in development or to be developed in the future, for example fifth generation (5G), sixth generation (6G), and so on. Baseband circuitry 604, for example one or more of baseband processors 604a through 604d, may handle various radio control functions that enable communication with one or more radio networks via RF circuitry 606. The radio control functions may include, but are not limited to, signal modulation and/or demodulation, encoding and/or decoding, radio frequency shifting, and so on. In some embodiments, modulation and/or demodulation circuitry of baseband circuitry 604 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 604e of the baseband circuitry 604 may be configured to run elements of the protocol stack for signaling of the PHY, MAC, RLC, PDCP and/or RRC layers. In some embodiments, the baseband circuitry may include one or more audio digital signal processors (DSP) 604f. The one or more audio DSPs 604f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 604 and application circuitry 602 may be implemented together such as, for example, on a system on a chip (SOC).

In some embodiments, baseband circuitry 604 may provide for communication compatible with one or more radio technologies. For example, in some embodiments, baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, RF circuitry 606 may include switches, filters, amplifiers, and so on, to facilitate the communication with the wireless network. RF circuitry 606 may include a receive signal path which may include circuitry to down-convert RF signals received from FEM circuitry 608 and provide baseband signals to baseband circuitry 604. RF circuitry 606 may also include a transmit signal path which may include circuitry to up-convert baseband signals provided by the baseband circuitry 1004 and provide RF output signals to FEM circuitry 1008 for transmission.

In some embodiments, RF circuitry 606 may include a receive signal path and a transmit signal path. The receive signal path of RF circuitry 606 may include mixer circuitry 606a, amplifier circuitry 606b and filter circuitry 606c. The transmit signal path of RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from FEM circuitry 608 based on the synthesized frequency provided by synthesizer circuitry 606d. Amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, mixer circuitry 606a of the transmit signal path may be configured to up-convert input baseband signals based on the synthesized frequency provided by synthesizer circuitry 606d to generate RF output signals for FEM circuitry 608. The baseband signals may be provided by the baseband circuitry 604 and may be filtered by filter circuitry 606c. Filter circuitry 606c may include a low-pass filter (LPF), although the scope of the embodiments is not limited in this respect.

In some embodiments, mixer circuitry 606a of the receive signal path and the mixer circuitry 606a of the transmit signal path may include two or more mixers and may be arranged for quadrature down conversion and/or up conversion respectively. In some embodiments, mixer circuitry 606a of the receive signal path and the mixer circuitry 606a of the transmit signal path may include two or more mixers and may be arranged for image rejection, for example Hartley image rejection. In some embodiments, mixer circuitry 606a of the receive signal path and the mixer circuitry 606a may be arranged for direct down conversion and/or direct up conversion, respectively. In some embodiments, mixer circuitry 606a of the receive signal path and mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 1006 may include analog-to-digital converter (ADC) and digital-to-analog converter (DAC) circuitry, and baseband circuitry 604 may include a digital baseband interface to communicate with RF circuitry 606. In some dual-mode embodiments, separate radio integrated circuit (IC) circuitry may be provided for processing signals for one or more spectra, although the scope of the embodiments is not limited in this respect.

In some embodiments, synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

Synthesizer circuitry 606d may be configured to synthesize an output frequency for use by mixer circuitry 606a of RF circuitry 1006 based on a frequency input and a divider control input. In some embodiments, synthesizer circuitry 606d may be a fractional N/N+1 synthesizer.

In some embodiments, frequency input may be provided by a voltage controlled oscillator (VCO), although that is not a requirement. Divider control input may be provided by either baseband circuitry 604 or applications processor 602 depending on the desired output frequency. In some embodiments, a divider control input (e.g., N) may be determined from a look-up table based on a channel indicated by applications processor 602.

Synthesizer circuitry 606d of RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1006 may include an in-phase and quadrature (IQ) and/or polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by RF circuitry 606 for transmission by one or more of the one or more antennas 610.

In some embodiments, FEM circuitry 608 may include a transmit/receive (TX/RX) switch to switch between transmit mode and receive mode operation. FEM circuitry 608 may include a receive signal path and a transmit signal path. The receive signal path of FEM circuitry 608 may include a low-noise amplifier (LNA) to amplify received RF signals and to provide the amplified received RF signals as an output, for example to RF circuitry 606. The transmit signal path of FEM circuitry 608 may include a power amplifier (PA) to amplify input RF signals, for example provided by RF circuitry 606, and one or more filters to generate RF signals for subsequent transmission, for example by one or more of antennas 610. In some embodiments, UE device 600 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of a user equipment (UE) may comprise circuitry to configure a scheduling request (SR) transmission based on a physical uplink control channel (PUCCH), combine the scheduling request with a buffer status report (BSR), transmit the combined SR and BSR in a single subframe to a network entity, receive uplink resource scheduling from the network entity in reply to the combined SR and BSR, and transmit uplink data to the network entity according to the uplink resource scheduling. In example two, the subject matter of example one or any of the examples described herein further may comprise an apparatus, wherein the PUCCH comprises PUCCH format 1, PUCCH format 1b, PUCCH format 2, or PUCCH format 3, or a combination thereof. In example three, the subject matter of example one or any of the examples described herein further may comprise radio-frequency circuitry to transmit a combined SR and BSR periodically. In example four, the subject matter of example one or any of the examples described herein further may comprise circuitry to transmit the BSR as a payload of PUCCH format 2 or PUCCH format 3. In example five, the subject matter of example one or any of the examples described herein further may comprise circuitry to transmit a channel state indicator (CSI) or an acknowledgement/negative acknowledgement (ACK/NACK) without transmitting the combined SR and BSR if the combined SR and BSR transmission collides with a CSI transmission or an ACK/NACK transmission in a same PUCCH resource. In example six, the subject matter of example one or any of the examples described herein further may comprise an apparatus, wherein one bit of the payload indicates an ACK/NACK and a discontinuous transmission (DTX) state, and another bit of the payload indicates a buffer status report group indicator (BSRGI). In example seven, the subject matter of example one or any of the examples described herein further may comprise, an apparatus wherein the BSR is divided into two or more groups, and a threshold is configured by radio resource control (RRC) signaling or as defined by a Third Generation Partnership Project (3GPP) standard.

In example eight, an apparatus of a user equipment (UE) may comprise circuitry to configure a scheduling request (SR) transmission based on a physical uplink control channel (PUCCH), combine the scheduling request with a buffer status report group indicator (BSRGI), transmit the combined SR and BSRGI in a single subframe to a network entity, receive uplink resource scheduling from the network entity in reply to the combined SR and BSRGI, and transmit uplink data to the network entity according to the uplink resource scheduling. In example nine, the subject matter of example eight or any of the examples described herein further may comprise circuitry to transmit the combined SR and BSRGI message based on PUCCH format 2. In example ten, the subject matter of example eight or any of the examples described herein further may comprise an apparatus, wherein the BSRGI comprises one bit or two bits at an end of a PUCCH format 2 payload. In example eleven, the subject matter of example eight or any of the examples described herein further may comprise circuitry to transmit the combined SR and BSRGI message transmitted with a periodic channel state indicator (CSI). In example twelve, the subject matter of example eight or any of the examples described herein further may comprise an apparatus wherein the SR is not transmitted if bits representing the BSRGI are all zeros.

In example thirteen, one or more computer-readable media may have instructions stored thereon that, if executed by user equipment (UE), result in configuring a scheduling request (SR) transmission based on a physical uplink control channel (PUCCH), combining the scheduling request with a buffer status report (BSR), transmitting the combined SR and BSR in a single subframe to a network entity, receiving uplink resource scheduling from the network entity in reply to the combined SR and BSR, and transmit uplink data to the network entity according to the uplink resource scheduling. In example fourteen, the subject matter of example thirteen or any of the examples described herein further may comprise one or more computer-readable media, wherein the PUCCH comprises PUCCH format 1, PUCCH format 1b, PUCCH format 2, or PUCCH format 3, or a combination thereof. In example fifteen, the subject matter of example thirteen or any of the examples described herein further may comprise one or more computer-readable media, wherein the instructions, if executed by the UE, result in transmitting a combined SR and BSR periodically. In example sixteen, the subject matter of example thirteen or any of the examples described herein further may comprise one or more computer-readable media, wherein the instructions, if executed by the UE, result in transmitting the BSR as a payload of PUCCH format 2 or PUCCH format 3. In example seventeen, the subject matter of example thirteen or any of the examples described herein further may comprise one or more computer-readable media, wherein the instructions, if executed by the UE, result in transmitting a channel state indicator (CSI) or an acknowledgement/negative acknowledgement (ACK/NACK) without transmitting the combined SR and BSR if the combined SR and BSR transmission collides with a CSI transmission or an ACK/NACK transmission in a same PUCCH resource. In example eighteen, the subject matter of example thirteen or any of the examples described herein further may comprise one or more computer-readable media, wherein one bit of the payload indicates an ACK/NACK and a discontinuous transmission (DTX) state, and another bit of the payload indicates a buffer status report group indicator (BSRGI). In example nineteen, the subject matter of example thirteen or any of the examples described herein further may comprise one or more computer-readable media, wherein the BSR is divided into two or more groups, and a threshold is configured by radio resource control (RRC) signaling as defined by a Third Generation Partnership Project (3GPP) standard.

In example twenty, one or more computer-readable media may have instructions stored thereon that, if executed by user equipment (UE), result in configuring a scheduling request (SR) transmission based on a physical uplink control channel (PUCCH), combining the scheduling request with a buffer status report group indicator (BSRGI), transmitting the combined SR and BSRGI in a single subframe to a network entity, receiving uplink resource scheduling from the network entity in reply to the combined SR and BSRGI, and transmitting uplink data to the network entity according to the uplink resource scheduling. In example twenty-one, the subject matter of example twenty or any of the examples described herein further may comprise one or more computer-readable media, wherein the instructions, if executed by the UE, result in transmitting the combined SR and BSRGI message based on PUCCH format 2. In example twenty-two, the subject matter of example thirteen or any of the examples described herein further may comprise one or more computer-readable media, wherein the BSRGI comprises one bit or two bits at an end of a PUCCH format 2 payload. In example twenty-three, the subject matter of example thirteen or any of the examples described herein further may comprise one or more computer-readable media, wherein the instructions, if executed by the UE, result in transmitting the combined SR and BSRGI message transmitted with a periodic channel state indicator (CSI). In example twenty-four, the subject matter of example thirteen or any of the examples described herein further may comprise one or more computer-readable media, wherein the SR is not transmitted if bits representing the BSRGI are all zeros.

Although the claimed subject matter has been described with a certain degree of particularity, it should be recognized that elements thereof may be altered by persons skilled in the art without departing from the spirit and/or scope of claimed subject matter. It is believed that the subject matter pertaining to non-contention based low latency scheduling request transmission and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A processor of a user equipment (UE) comprising circuitry to:
configure a scheduling request (SR) transmission based on a physical uplink control channel (PUCCH);

combine the scheduling request with a buffer status report group indicator (BSRGI), wherein a buffer status report (BSR) is divided into two or more groups and the BSRGI is used to indicate to which BSR group the BSR belongs, wherein a value of the BSRGI is based on a BSR group threshold indicating a maximum buffer size for the value of the BSRGI, wherein the BSR group threshold is based on a power control factor of the UE or uplink Channel State Information (CSI) for the UE, wherein the BSRGI is added to an end of the CSI;

transmit the combined SR and BSRGI in a single subframe to a network entity;

receive uplink resource scheduling from the network entity in reply to the combined SR and BSRGI; and transmit uplink data to the network entity according to the uplink resource scheduling.

2. The processor as claimed in claim 1, wherein the PUCCH comprises PUCCH format 1, PUCCH format 1b, PUCCH format 2, or PUCCH format 3, or a combination thereof.

3. The processor as claimed in claim 1, wherein the combined SR and BSRGI are transmitted periodically.

4. The processor as claimed in claim 1, wherein the BSRGI is transmitted as a payload of PUCCH format 2 or PUCCH format 3.

5. The processor as claimed in claim 1, wherein the processor further comprises circuitry to:

transmit the CSI or an acknowledgement/negative acknowledgement (ACK/NACK) without transmitting the combined SR and BSRGI if the combined SR and BSRGI transmission collides with the CSI transmission or an ACK/NACK transmission in a same PUCCH resource.

6. The processor as claimed in claim 5, wherein one bit of a payload of the PUCCH indicates the ACK/NACK and a discontinuous transmission (DTX) state, and another bit of the payload of the PUCCH indicates the BSRGI.

7. A user equipment (UE) comprising:

radio frequency (RF) circuitry configured to communicate with a network entity; and a processor communicatively coupled to the RF circuitry and configured to perform operations comprising:

configuring a scheduling request (SR) transmission based on a physical uplink control channel (PUCCH);

combining the scheduling request with a buffer status report group indicator (BSRGI), wherein a buffer status report (BSR) is divided into two or more groups and the BSRGI is used to indicate to which BSR group the BSR belongs, wherein a value of the BSRGI is based on a BSR group threshold indicating a maximum buffer size for the value of the BSRGI, wherein the BSR group threshold is based on a power control factor of the UE or uplink Channel State Information (C SI) for the UE, wherein the BSRGI is added to an end of the CSI;

transmitting the combined SR and BSRGI in a single subframe to the network entity;

receiving uplink resource scheduling from the network entity in reply to the combined SR and BSRGI; and transmitting uplink data to the network entity according to the uplink resource scheduling.

8. The UE as claimed in claim 7, wherein the combined SR and BSRGI message are transmitted based on PUCCH format 2.

9. The UE as claimed in claim 8, wherein the BSRGI comprises one bit or two bits at an end of a PUCCH format 2 payload.

10. The UE as claimed in claim 7, wherein the SR is not transmitted if bits representing the BSRGI are all zeros.

11. The UE as claimed in claim 7, wherein the operations further comprise:

transmitting the CSI or an acknowledgement/negative acknowledgement (ACK/NACK) without transmitting the combined SR and BSRGI if the combined SR and BSRGI transmission collides with the CSI transmission or an ACK/NACK transmission in a same PUCCH resource.

12. The UE as claimed in claim 11, wherein one bit of a payload of the PUCCH indicates the ACK/NACK and a discontinuous transmission (DTX) state, and another bit of the payload of the PUCCH indicates the BSRGI.

13. The UE as claimed in claim 7, wherein the combined SR and BSRGI are transmitted periodically.

14. The UE as claimed in claim 7, wherein the BSRGI is transmitted as a payload of PUCCH format 2 or PUCCH format 3.

15. One or more non-transitory computer-readable media having instructions stored thereon that, if executed by a user equipment (UE), result in:

configuring a scheduling request (SR) transmission based on a physical uplink control channel (PUCCH);

combining the scheduling request with a buffer status report group indicator (BSRGI), wherein a buffer status report (BSR) is divided into two or more groups and the BSRGI is used to indicate to which BSR group the BSR belongs, wherein a value of the BSRGI is based on a BSR group threshold indicating a maximum buffer size for the value of the BSRGI, wherein the BSR group threshold is based on a power control factor of the UE or uplink Channel State Information (CSI) for the UE, wherein the BSRGI is added to an end of the CSI;

transmitting the combined SR and BSRGI in a single subframe to a network entity;

receiving uplink resource scheduling from the network entity in reply to the combined SR and BSR; and transmitting uplink data to the network entity according to the uplink resource scheduling.

16. The one or more non-transitory computer-readable media as claimed in claim 15, wherein the PUCCH comprises PUCCH format 1, PUCCH format 1b, PUCCH format 2, or PUCCH format 3, or a combination thereof.

17. The one or more non-transitory computer-readable media as claimed in claim 15, wherein the instructions, if executed by the UE, result in transmitting a combined SR and BSRGI periodically.

18. The one or more non-transitory computer-readable media as claimed in claim 15, wherein the instructions, if executed by the UE, result in transmitting the BSRGI as a payload of PUCCH format 2 or PUCCH format 3.

19. The one or more non-transitory computer-readable media as claimed in claim 15, wherein the instructions, if executed by the UE, result in:

transmitting the CSI or an acknowledgement/negative acknowledgement (ACK/NACK) without transmitting the combined SR and BSRGI if the combined SR and BSR transmission collides with the CSI transmission or an ACK/NACK transmission in a same PUCCH resource.

20. The one or more non-transitory computer-readable media as claimed in claim 19, wherein one bit of a payload of the PUCCH indicates the ACK/NACK and a discontinuous transmission (DTX) state, and another bit of the payload of the PUCCH indicates the BSRGI.

* * * * *